US008060763B2

(12) United States Patent
Lu

(10) Patent No.: US 8,060,763 B2
(45) Date of Patent: Nov. 15, 2011

(54) COMPUTER SYSTEM AND POWER CONTROL APPARATUS THEREOF

(75) Inventor: Chun-Ying Lu, Taipei (TW)

(73) Assignee: Inventec Corporation, Taipei (TW)

( * ) Notice: Subject to any disclaimer, the term of this patent is extended or adjusted under 35 U.S.C. 154(b) by 445 days.

(21) Appl. No.: 12/414,990

(22) Filed: Mar. 31, 2009

(65) Prior Publication Data

US 2010/0162007 A1    Jun. 24, 2010

(30) Foreign Application Priority Data

Dec. 18, 2008   (TW) ............................... 97149540 A

(51) Int. Cl.
*H02H 5/04* (2006.01)
*G06F 1/26* (2006.01)

(52) U.S. Cl. ................. 713/300; 713/1; 713/2; 361/103

(58) Field of Classification Search .................. 713/1, 2, 713/300; 361/103
See application file for complete search history.

(56) References Cited

U.S. PATENT DOCUMENTS

| | | | |
|---|---|---|---|
| 6,816,351 B1* | 11/2004 | Frank et al. | 361/103 |
| 7,317,605 B2* | 1/2008 | Donze et al. | 361/103 |
| 7,420,792 B2* | 9/2008 | Zhang | 361/103 |
| 7,787,229 B2* | 8/2010 | Deng et al. | 361/103 |
| 2003/0123206 A1* | 7/2003 | Gower et al. | 361/93.8 |
| 2004/0042136 A1* | 3/2004 | Kuo | 361/25 |
| 2005/0010827 A1* | 1/2005 | McAfee et al. | 713/300 |
| 2009/0303766 A1* | 12/2009 | Park et al. | 363/126 |

* cited by examiner

*Primary Examiner* — Vincent Tran
*Assistant Examiner* — Zahid Choudhury
(74) *Attorney, Agent, or Firm* — J.C. Patents

(57) ABSTRACT

A power control apparatus is disclosed. The power control apparatus includes a temperature sensor, a level-controlling unit, a reset unit and a first voltage converter. The temperature sensor is for sensing an operation temperature of a computer system and accordingly outputs a sensing signal. The level-controlling unit is for deciding whether or not to output a control voltage according to the sensing signal. The reset unit is for producing a reset signal according to a plurality of reference voltages generated by dividing the power voltage and using the control voltage to adjust the levels of the reference voltages. The first voltage converter is for producing a start signal according to the reset signal, wherein the start signal is for enabling the embedded controller.

20 Claims, 4 Drawing Sheets

COMPUTER SYSTEM AND POWER CONTROL APPARATUS THEREOF

CROSS-REFERENCE TO RELATED APPLICATION

This application claims the priority benefit of Taiwan application serial no. 97149540, filed Dec. 18, 2008. The entirety of the above-mentioned patent application is hereby incorporated by reference herein and made a part of this specification.

BACKGROUND OF THE INVENTION

1. Field of the Invention

The present invention generally relates to a computer system and a power control apparatus thereof, and more particularly, to a computer system and a power control apparatus thereof with overheat protection mechanism.

2. Description of Related Art

FIG. 1 is a localized diagram of a conventional computer system. Referring to FIG. 1, a conventional computer system 100 includes a temperature sensor 110, an embedded controller 120, two resistors R11 and R12, a capacitor C1 and a diode Z1. In a normal situation of the computer system 100, the temperature sensor 110 does not produce a sensing signal STH1 with a low logic-level, and a voltage V1 taking a conductive path between the resistor R12 and the capacitor C1 enables the embedded controller 120 normally working.

On the contrary, when the CPU or an operation component in the conventional computer system 100 gets overheat, the temperature sensor 110 produces a sensing signal STH1 with a low logic-level, and the embedded controller 120 quits to normally work, which further shuts down the computer system 100 to prevent the computer from running in the overheat status. Meanwhile, the embedded controller 120 would receive a reset signal SRE1 through the diode Z1. When the reset signal SRE1 is switched into the low logic-level, the embedded controller 120 fails normally working and shuts down the computer as well. The capacitor C1 serves as a path for discharging or charging to assist the above-mentioned operation mechanism.

It should be noted that the above-mentioned prior art features by using the sensing signal STH1 produced by the temperature sensor 110 so as to enable or disable the embedded controller 120 to achieve the overheat protection mechanism. However, the above-mentioned scheme has two disadvantages. First, after the conventional computer system 100 is shut down due to the low logic-level of the sensing signal STH1, a user may want to restart the computer by pressing the starting key of the computer system. At the time, if the sensed temperature still keeps over 85° C., the temperature sensor 110 would continue producing the sensing signal STH1 with the low logic-level, which forces the computer system 100 to be shut down again.

Next, after the conventional computer system 100 is shut down due to the low logic-level of the sensing signal STH1, before the voltage V1 received by the embedded controller 120 is completely discharged, the embedded controller 120 keeps normally working; i.e., the temperature sensor 110 controlled by the embedded controller 120 keeps normally working. At the time, if a user presses the starting key of the computer system, the conventional computer system 100 would be compellably shut down since the temperature sensor 110 is working normally to directly output the sensing signal STH1 with the low logic-level.

In short, the above-mentioned two situations result in forcing the computer system continuously shut down after the computer is started, which gives the user a wrong message that the computer gets fault or encourages the user to start the computer again and again leading a shorter lifetime.

SUMMARY OF THE INVENTION

Accordingly, the present invention is directed to a power control apparatus, wherein a reset unit does not output a reset signal when a computer system in overheat so that an employed embedded controller quits to work normally. In this way, the present invention is able to lengthen the duration of thermal shutdown to make the computer system work more stably.

The present invention is also directed to a computer system able to increase the stability of the computer system by lengthening the duration of thermal shutdown and to avoid repeatedly starting operations of the computer after a pre-designed overheat protection mechanism is started.

The present invention provides a power control apparatus for controlling an embedded controller in a computer system. The power control apparatus includes a temperature sensor, a level-controlling unit, a reset unit and a first voltage converter. The temperature sensor herein is for sensing an operation temperature in the computer system so as to output a sensing signal. The level-controlling unit decides whether or not to output a control voltage according to the sensing signal. The reset unit is for producing a reset signal according to a plurality of reference voltages generated by dividing a power voltage. It should be noted that when the reset unit receives the control voltage from the level-controlling unit, the control voltage is used to adjust the levels of the reference voltages. The first voltage converter herein is for producing a start signal according to the reset signal, wherein the start signal is for enabling the embedded controller.

In an embodiment of the present invention, the above-mentioned power control apparatus further includes a second voltage converter and a third voltage converter, wherein the second voltage converter is for converting the power voltage into a second voltage serving as the operation voltage of the reset unit, and the third voltage converter is for converting the power voltage into a third voltage serving as the operation voltage of the embedded controller. In addition, the first voltage converter further generates a first voltage according to the reset signal and the first voltage serves as the operation voltage of the internal circuit of the computer system. The power voltage herein is greater than the second voltage, the second voltage is greater than the third voltage and the third voltage is greater than the first voltage.

In an embodiment of the present invention, when the operation temperature is within a preset range of the temperature sensor, the above-mentioned temperature sensor outputs the sensing signal with a first level so that the level-controlling unit is unable to output the control voltage; when the operation temperature is beyond the preset range of the temperature sensor, the temperature sensor outputs the sensing signal with a second level so that the level-controlling unit outputs the control voltage.

On the other hand, the present invention provides a computer system, which includes an embedded controller and the above-mentioned power control apparatus. The power control apparatus is electrically connected to the embedded controller for enabling or disabling the operation of the embedded controller.

Based on the description above, the present invention uses the sensing signal produced by the temperature sensor to decide whether or not the control voltage is output. When the computer system gets overheat, the reset unit would receive the control voltage so that the reset signal is unable to be output and thereby the embedded is disabled. In this way, the present invention can lengthen the duration of thermal shutdown and the computer system wins sufficient time to make the third voltage received by the embedded controller discharged and the system is able to dissipate the heat thereof in a longer duration. In comparison with the prior art, the present invention can avoid repeatedly starting operations of the computer after the overheat protection mechanism is started and prevent the user from having a wrong message that the computer is damaged.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
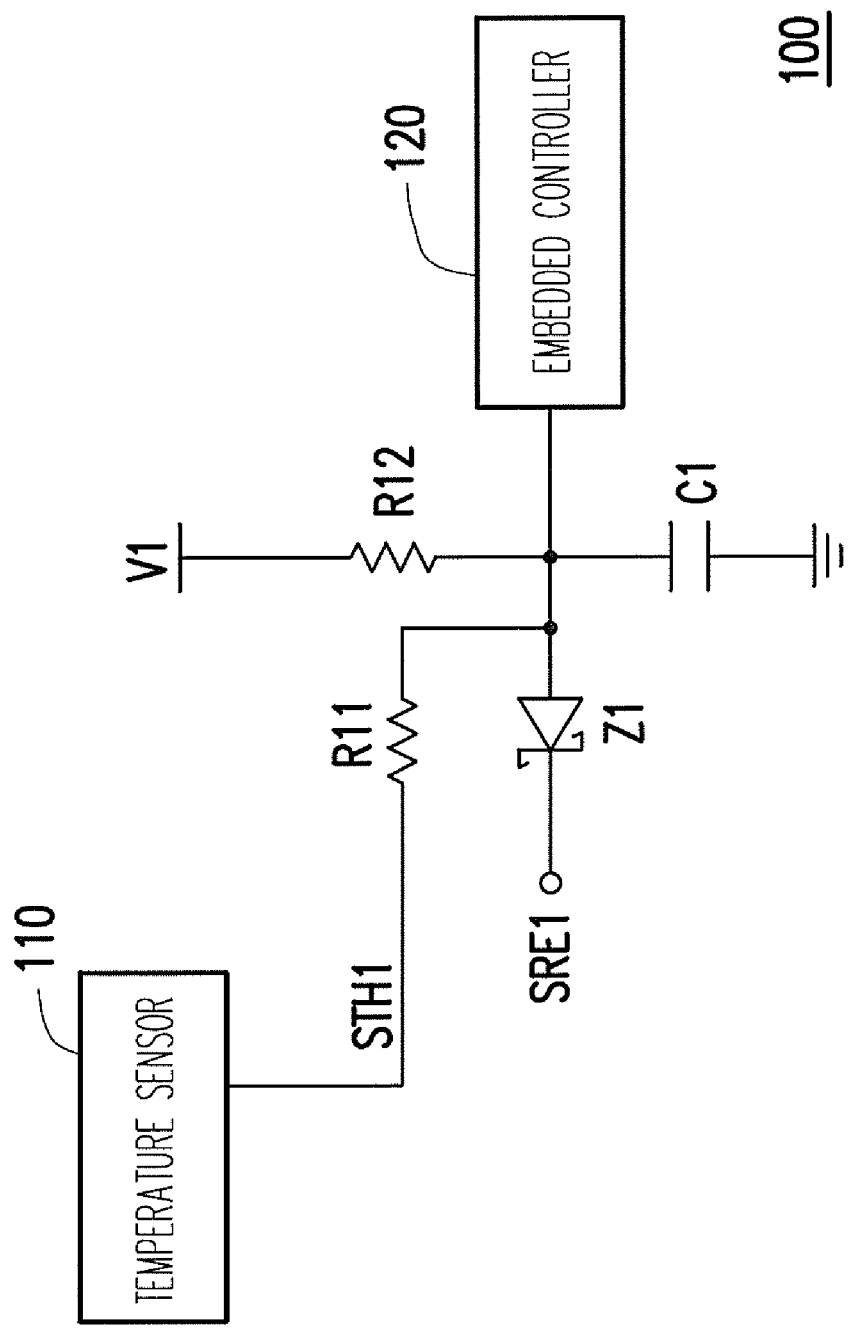
FIG. 1 is a localized diagram of a conventional computer system.

Reference will now be made in detail to the present preferred embodiments of the invention, examples of which are illustrated in the accompanying drawings. Wherever possible, the same reference numbers are used in the drawings and the description to refer to the same or like parts.

Figure 2:
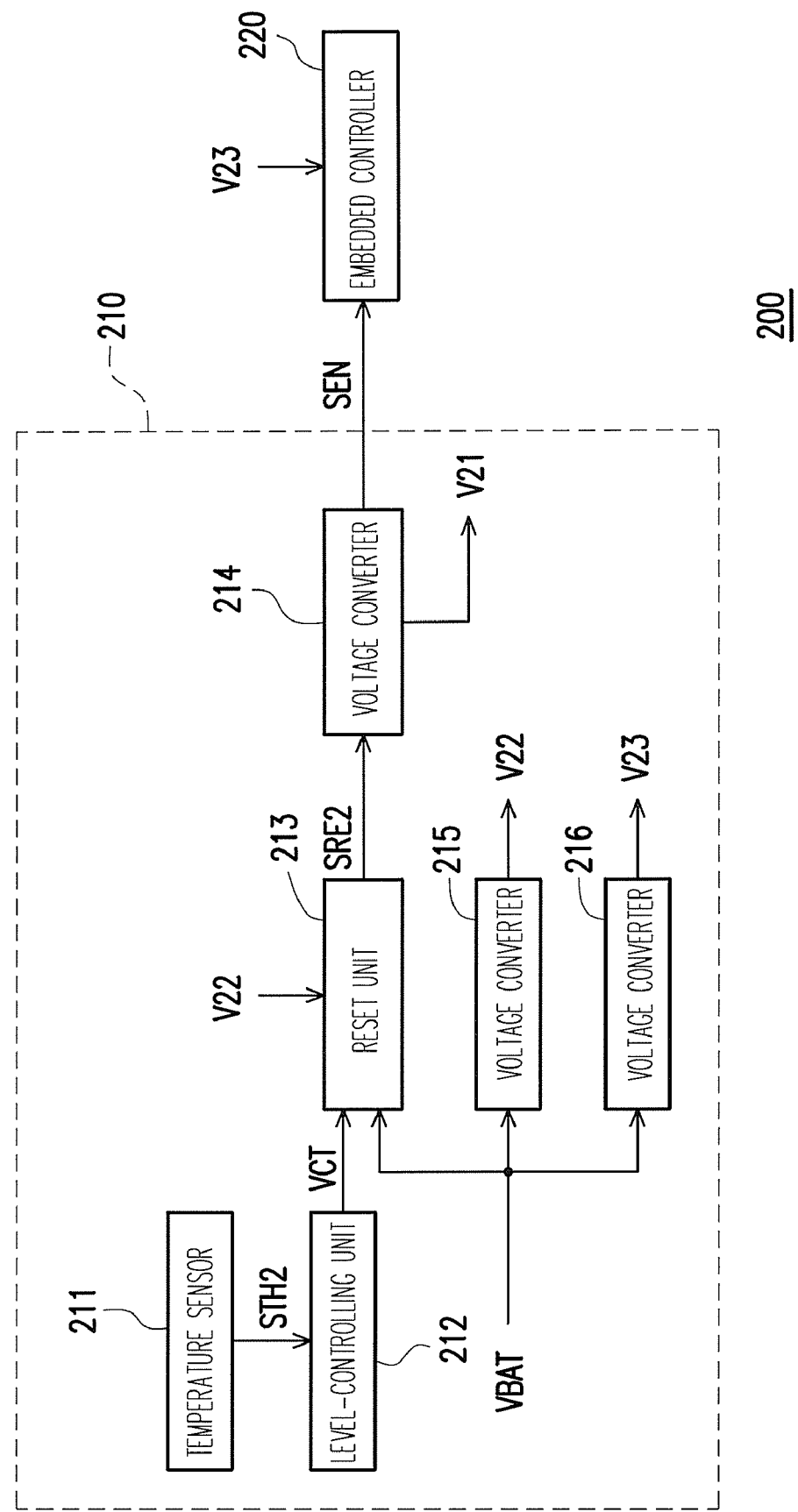
FIG. 2 is a localized block diagram showing the structure of a computer system according to an embodiment of the present invention.

FIG. 2 is a localized block diagram showing the structure of a computer system according to an embodiment of the present invention. Referring to FIG. 2, a computer system 200 includes a power control apparatus 210 and an embedded controller 220, wherein the power control apparatus 210 is electrically connected to the embedded controller 220 for enabling or disabling the embedded controller 220, so that the computer system 200 can be normally started and shut down. During starting the computer system 200, a temperature sensor 211 works normally only after the embedded controller 220 works normally.

The power control apparatus 210 further includes a temperature sensor 211, a level-controlling unit 212, a reset unit 213 and a plurality of voltage converters 214-216. The level-controlling unit 212 herein is electrically connected to the temperature sensor 211 and the reset unit 213. The voltage converter 214 is electrically connected to the reset unit 213 and the embedded controller 220. The voltage converters 215 and 216 are respectively electrically connected to the reset unit 213 and the embedded controller 220.

In terms of the operations of the components, the temperature sensor 211 is for sensing the operation temperature of an operation component in the computer system 200, for example, the temperatures of a CPU or the chip thereof, a component or a motherboard so as to output a sensing signal STH2. The level-controlling unit 212 is for deciding whether or not to output a control voltage VCT according to the sensing signal STH2. In addition, the reset unit 213 would produce a reset signal SRE2 according to a plurality of reference voltages generated by dividing a power voltage VBAT. It should be noted that when the reset unit 213 receives the control voltage VCT from the level-controlling unit 212, the reset unit 213 uses the control voltage VCT to adjust the level of the reference voltages.

Figure 3:
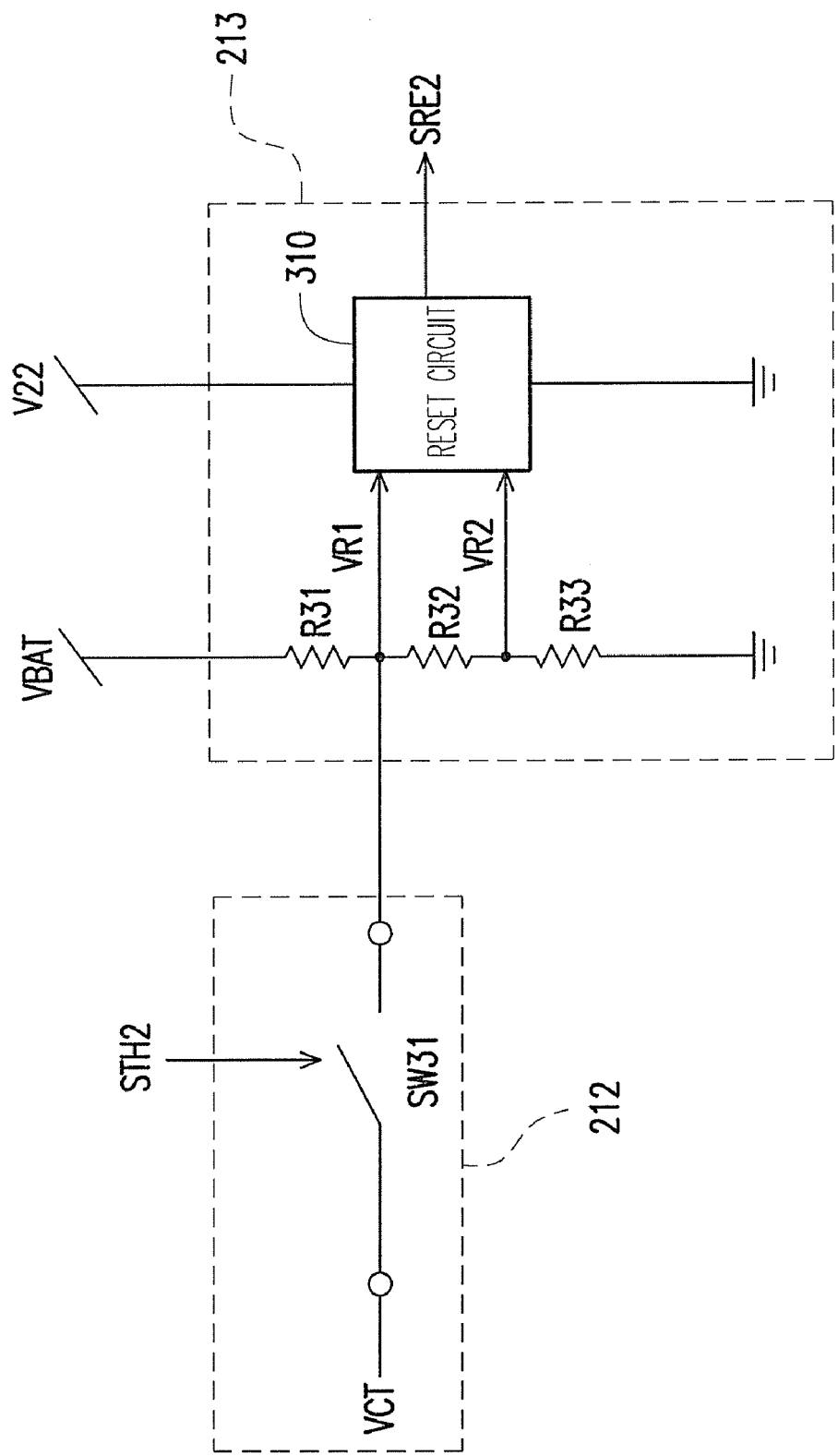
FIG. 3 is a diagram showing the detail architecture of the level-controlling unit 212 and the reset unit 213 of FIG. 2.

Taking an example, FIG. 3 is a diagram showing the detail architecture of the level-controlling unit 212 and the reset unit 213 of FIG. 2. In the embodiment, as shown in FIG. 3, the level-controlling unit 212 includes a switch SW31, wherein the first terminal of the switch SW31 receives the control voltage VCT and the second terminal thereof is electrically connected to the reset unit 213.

During running of the computer system 200, when the operation temperature of an operation component is within a preset range of the temperature sensor 211, i.e., the computer system 200 works normally, the temperature sensor 211 would output a sensing signal STH2 with a first level (for example, logic 1). Meanwhile, the switch SW31 is turned off so that the control voltage VCT is unable to be output to the reset unit 213 and the reset circuit 310 keeps receiving the reference voltages generated by dividing the power voltage VBAT for normally working. On the contrary, when the operation temperature of an operation component in the computer system 200 is beyond the preset range of the temperature sensor 211, i.e., the computer system 200 gets overheat, the temperature sensor 211 would output the sensing signal STH2 with a second level (for example, logic 0). Meanwhile, the switch SW31 is turned on between the first terminal and the second terminal thereof in response to the sensing signal STH2 so that the control voltage VCT (for example, a grounding voltage) is output to the reset unit 213.

Although the first level and the second level in the embodiment are exemplarily assigned by the logic 1 and the logic 0, which the present invention is not limited to. For example, anyone skilled in the art can switch the above-mentioned assignation, i.e., the first level and the second level are assigned by the logic 0 and the logic 1. Besides, the structure detail of the level-controlling unit 212 can be accordingly modified according to the real first level and second level.

Figure 4:
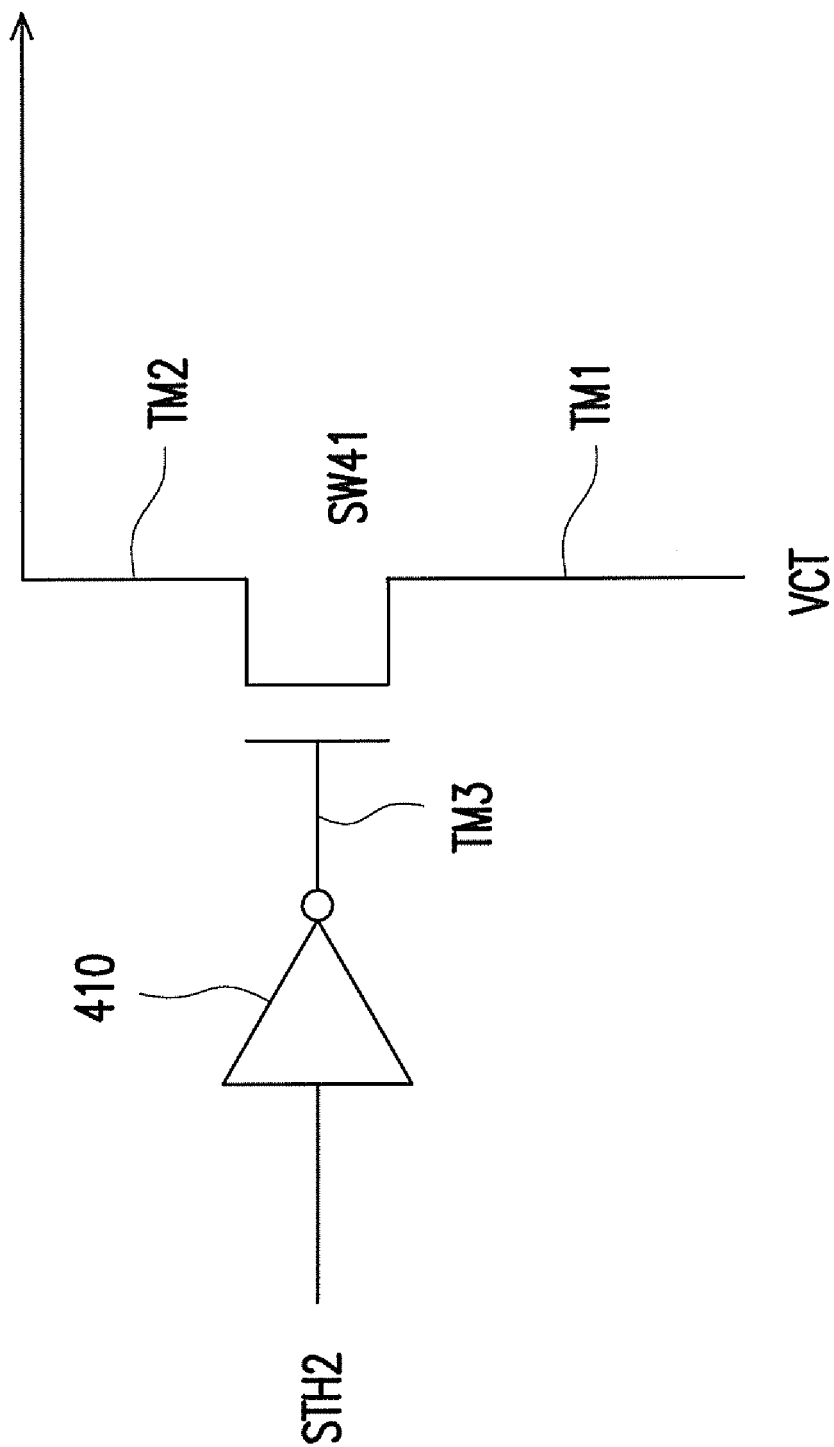
FIG. 4 is another diagram showing the detail architecture of the level-controlling unit 212 of FIG. 2.

When the first level and the second level are respectively, for example, logic 1 and logic 0, the level-controlling unit 212 can have another structure, as shown by FIG. 4, which is another diagram showing the detail architecture of the level-controlling unit 212 of FIG. 2. Referring to FIG. 4, the level-controlling unit 212 herein includes an inverter 410 and a switch SW41, wherein the switch SW41 is implemented by an N-type transistor, the first terminal TM1 of the switch SW41 receives the control voltage VCT and the second terminal TM2 thereof is electrically connected to the reset unit 213. In order to make the sensing signal STH2 with the second level (logic 0) can turn on the switch SW41, the level-controlling unit 212 uses the input terminal of the inverter 410 to receive the sensing signal STH2 and the output terminal of the inverter 410 is electrically connected to the control terminal TM3 of the switch SW41.

In more details, if the first level is logic 0 and the second level is logic 1, in order to make the sensing signal STH2 with the second level (logic 1) turn on the switch SW41, the switch SW41 in FIG. 4 can be changed into a P-type transistor or the inverter 410 in FIG. 4 is removed. In short, no matter what the first level, the second level and the architecture of the level-controlling unit 212 are, when the computer system 200 normally works, the level-controlling unit 212 is unable to output the control voltage VCT according to the sensing signal STH2 with the first level. When the computer system 200 gets overheat, the level-controlling unit 212 can output the control voltage VCT according to the sensing signal STH2 with the second level.

Continuing to FIG. 3, where the detail architecture of the reset unit 213 is given, the reset unit 213 herein includes a plurality of resistors R31-R33 and a reset circuit 310. The first end of the resistor R31 receives the power voltage VBAT and the second end thereof is electrically connected to the level-controlling unit 212. The first end of the resistor R32 is electrically connected to the second end of the resistor R31. The first end of the resistor R33 is electrically connected to the second end of the resistor R32 and the second end of the resistor R33 is electrically connected to a ground terminal. The reset circuit 310 is electrically connected to the second ends of the resistors R31.and R32 and the voltage converter 214.

In terms of the operations of the components, when the computer system 200 normally works, since the level-controlling unit 212 is unable to output the control voltage VCT, the resistors R31-R33 in serial connection can obtain a plurality of dividing voltages from the power voltage VBAT applying thereon, wherein the dividing voltages VR1 and VR2 serve as reference voltages VR1 and VR2. Meanwhile the reset circuit 310 respectively compares the reference voltages VR1 and VR2 with a preset voltage in the reset circuit 310 to decide whether or not to produce the reset signal SRE2 according to the comparison result.

In the embodiment, when the reference voltages VR1 and VR2, for example, are respectively greater than the preset voltage, the reset circuit 310 produces the reset signal SRE2. On the contrary, when the reference voltages VR1 and VR2 are respectively less than the preset voltage, the reset circuit 310 does not produce the reset signal SRE2. In other words, when the computer system 200 normally works, in response to a too low power voltage VBAT of the computer system 200, the levels of the reference voltages VR1 and VR2 would be accordingly reduced, which further makes the reset circuit 310 cease producing the reset signal SRE2.

On the other hand, when the computer system 200 gets overheat, since the level-controlling unit 212 can output the control voltage VCT, so that the reference voltage VR1 at the time is equal to the control voltage VCT. Since the preset voltage provided by the reset circuit 310 is greater than the control voltage VCT, the reference voltages VR1 and VR2 at the time would respectively less than the preset voltage and the reset circuit 310 accordingly ceases producing the reset signal SRE2. In other words, when the computer system 200 gets overheat, the reset circuit 310 also ceases producing the reset signal SRE2.

Continuing to FIG. 2, the operation of the computer system 200 is depicted as follows. The voltage converter 214 is for producing a start signal SEN and a first voltage V21 according to the reset signal SRE2, wherein the start signal SEN is for enabling the embedded controller 220 and the computer system 200 uses the first voltage V21 as the operation voltage of the internal circuit thereof. The voltage converter 215 is for converting the power voltage VBAT into a second voltage V22 serving as the operation voltage of the reset unit 213. The voltage converter 216 is for converting the power voltage VBAT into a third voltage V23 serving as the operation voltage of the embedded controller 220. In the embodiment, the power voltage VBAT>the second voltage V22>third voltage V23>first voltage V21.

When the computer system 200 normally works and the power voltage VBAT thereof is sufficient, the reset unit 213 durably outputs reset signal SRE2 and the voltage converter 214 also durably produces the start signal SEN. At the time, the embedded controller 220 starts the corresponding operation according to the start signal SEN. On the other hand, when the computer system 200 gets overheat, the reset circuit 310 ceases producing the reset signal SRE2 and the voltage converter 214 also ceases producing the start signal SEN. In this way, the embedded controller 220 is unable to normally work, which shuts down the computer system 200 to achieve the overheat protection mechanism.

After the computer system 200 enters the status of the overheat protection mechanism, if the user presses a starting key (not shown) of the computer system 200, only after the successive operations of the level-controlling unit 212, the reset unit 213 and the voltage converter 214, the embedded controller 220 in the computer system 200 can normally work, which lengthens the duration of thermal shutdown so that the computer system 200 wins sufficient time to make the third voltage V23 received by the embedded controller 220 discharged and longer time to dissipate the heat thereof.

In summary, the present invention uses the sensing signal produced by the temperature sensor for deciding whether or not to output the control voltage. When the computer system gets overheat, the reset circuit receives the control voltage to cease outputting the reset signal so that the embedded controller quits the normal operation. On the other hand, when the computer system needs to be restarted, the successive operations of the level-controlling unit, the reset unit and the voltage converter are required, which makes the embedded controller normally work. In this way, the computer system has sufficient time to make the third voltage received by the embedded controller discharged and has longer time to dissipate the heat thereof.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A power control apparatus, used for controlling an embedded controller in a computer system, the power control apparatus comprising:
   a temperature sensor, for sensing an operation temperature in the computer system and accordingly outputting a sensing signal;
   a level-controlling unit, for deciding whether or not to output a control voltage according to the sensing signal;
   a reset unit, for producing a reset signal according to a plurality of reference voltages generated by dividing a power voltage, wherein the reset unit uses the control voltage to adjust the levels of the reference voltages; and
   a first voltage converter, for producing a start signal according to the reset signal, wherein the start signal is for enabling the embedded controller.

2. The power control apparatus as claimed in claim 1, further comprising:
   a second voltage converter, for converting the power voltage into a second voltage serving as the operation voltage of the reset unit; and
   a third voltage converter, for converting the power voltage into a third voltage serving as the operation voltage of the embedded controller, wherein the first voltage converter further generates a first voltage according to the reset signal and the first voltage serves as the operation voltage of the internal circuit of the computer system.

3. The power control apparatus as claimed in claim 2, wherein the power voltage is greater than the second voltage, the second voltage is greater than the third voltage and the third voltage is greater than the first voltage.

4. The power control apparatus as claimed in claim 1, wherein the reset unit comprises:
   a first resistor, having a first end and a second end, wherein the first end is for receiving a second power voltage and the second end is electrically connected to the level-controlling unit;
   a second resistor, having a first end and a second end, wherein the first end is electrically connected to the second end of the first resistor;
   a third resistor, having a first end and a second end, wherein the first end is electrically connected to the second end of the second resistor and the second end is electrically connected to a ground terminal; and a reset circuit, electrically connected to the second end of the first resistor, the second end of the second resistor and the first voltage converter for comparing the reference voltages respectively generated by and come from the second end of the first resistor and the second end of the second resistor with a preset voltage in the reset circuit and producing the reset signal according to the comparison result, wherein the preset voltage is greater than the control voltage.

5. The power control apparatus as claimed in claim 1, wherein the level-controlling unit comprises:

a switch, having a first terminal and a second terminal, wherein the first terminal receives the control voltage and the second terminal is electrically connected to the reset unit, and the switch decides whether or not the first terminal and the second terminal thereof are conductive.

6. The power control apparatus as claimed in claim 5, wherein the switch is implemented by an N-type transistor.

7. The power control apparatus as claimed in claim 5, wherein the level-controlling unit further comprises:

an inverter, having an input terminal and an output terminal, wherein the input terminal receives the sensing signal and the output terminal is electrically connected to a control terminal of the switch.

8. The power control apparatus as claimed in claim 1, wherein when the operation temperature is within a preset range of the temperature sensor, the temperature sensor outputs the sensing signal with a first level so that the level-controlling unit is unable to output the control voltage; when the operation temperature is beyond the preset range of the temperature sensor, the temperature sensor outputs the sensing signal with a second level so that the level-controlling unit outputs the control voltage.

9. The power control apparatus as claimed in claim 8, wherein the first level is logic 1 and the second level is logic 0.

10. The power control apparatus as claimed in claim 8, wherein the first level is logic 0 and the second level is logic 1.

11. A computer system, comprising:

an embedded controller; and a power control apparatus, electrically connected to the embedded controller for controlling the operation of the embedded controller, wherein the power control apparatus comprises:

a temperature sensor, for sensing an operation temperature in the computer system and accordingly outputting a sensing signal;

a level-controlling unit, for deciding whether or not to output a control voltage according to the sensing signal;

a reset unit, for producing a reset signal according to a plurality of reference voltages generated by dividing a power voltage, wherein the reset unit uses the control voltage to adjust the levels of the reference voltages; and a first voltage converter, for producing a start signal according to the reset signal, wherein the start signal is for enabling the embedded controller.

12. The computer system as claimed in claim 11, wherein the power control apparatus further comprises:

a second voltage converter, for converting the power voltage into a second voltage serving as the operation voltage of the reset unit; and a third voltage converter, for converting the power voltage into a third voltage serving as the operation voltage of the embedded controller, wherein the first voltage converter further generates a first voltage according to the reset signal and the first voltage serves as the operation voltage of the internal circuit of the computer system.

13. The computer system as claimed in claim 12, wherein the power voltage is greater than the second voltage, the second voltage is greater than the third voltage and the third voltage is greater than the first voltage.

14. The computer system as claimed in claim 12, wherein the reset unit comprises:

a first resistor, having a first end and a second end, wherein the first end is for receiving a second power voltage and the second end is electrically connected to the level-controlling unit;

a second resistor, having a first end and a second end, wherein the first end is electrically connected to the second end of the first resistor;

a third resistor, having a first end and a second end, wherein the first end is electrically connected to the second end of the second resistor and the second end is electrically connected to a ground terminal; and a reset circuit, electrically connected to the second end of the first resistor, the second end of the second resistor and the first voltage converter for comparing the reference voltages respectively generated by and come from the second end of the first resistor and the second end of the second resistor with a preset voltage in the reset circuit and producing the reset signal according to the comparison result, wherein the preset voltage is greater than the control voltage.

15. The computer system as claimed in claim 11, wherein the level-controlling unit comprises:

a switch, having a first terminal and a second terminal, wherein the first terminal receives the control voltage and the second terminal is electrically connected to the reset unit, and the switch decides whether or not the first terminal and the second terminal thereof are conductive.

16. The computer system as claimed in claim 15, wherein the switch is implemented by an N-type transistor.

17. The computer system as claimed in claim 15, wherein the level-controlling unit further comprises:

an inverter, having an input terminal and an output terminal, wherein the input terminal receives the sensing signal and the output terminal is electrically connected to a control terminal of the switch.

18. The computer system as claimed in claim 11, wherein when the operation temperature is within a preset range of the temperature sensor, the temperature sensor outputs the sensing signal with a first level so that the level-controlling unit is unable to output the control voltage; when the operation temperature is beyond the preset range of the temperature sensor, the temperature sensor outputs the sensing signal with a second level so that the level-controlling unit outputs the control voltage.

19. The computer system as claimed in claim 18, wherein the first level is logic 1 and the second level is logic 0.

20. The computer system as claimed in claim 18, wherein the first level is logic 0 and the second level is logic 1.

* * * * *